United States Patent [19]

Braschel

[11] Patent Number: 5,033,799
[45] Date of Patent: Jul. 23, 1991

[54] METHOD OF CONTROLLING THE BRAKE PRESSURE IN AN ANTILOCK VEHICLE BRAKE SYSTEM

[75] Inventor: Volker Braschel, Neuwied, Fed. Rep. of Germany

[73] Assignee: Lucas Industries Public Limited Company, Birmingham, England

[21] Appl. No.: 458,694

[22] PCT Filed: Jun. 6, 1989

[86] PCT No.: PCT/EP89/00630
§ 371 Date: Jan. 22, 1990
§ 102(e) Date: Jan. 22, 1990

[87] PCT Pub. No.: WO89/11989
PCT Pub. Date: Dec. 14, 1989

[30] Foreign Application Priority Data
Jun. 7, 1988 [DE] Fed. Rep. of Germany ....... 3819424

[51] Int. Cl.$^5$ .................. B60T 8/66; B60T 8/32
[52] U.S. Cl. .................. 303/109; 188/181 C; 303/100; 303/105; 303/110
[58] Field of Search .................. 303/91, 102, 103, 105, 303/106, 107, 108, 109, 96, 97, 98, 95, 110, 100; 364/426.01, 426.02, 426.03; 188/181 C, 181 A, 181 T

[56] References Cited

U.S. PATENT DOCUMENTS

| | | | |
|---|---|---|---|
| 3,754,797 | 8/1973 | Rodi et al. | 303/96 |
| 3,948,570 | 4/1976 | Fukumori et al. | 303/106 |
| 4,089,564 | 5/1978 | Öberg | 188/181 C X |
| 4,094,556 | 6/1978 | Okamoto et al. | 188/181 C X |
| 4,321,676 | 3/1982 | Ohmori et al. | 303/106 X |
| 4,358,164 | 11/1982 | Bleckmann et al. | 364/426.02 X |
| 4,446,522 | 5/1984 | Sato et al. | 303/106 X |
| 4,665,490 | 5/1987 | Masaki et al. | 303/103 X |
| 4,675,819 | 6/1987 | Fennel | 303/106 X |
| 4,729,608 | 3/1988 | Fennel jet al. | 303/109 X |
| 4,739,484 | 4/1988 | Fennel | 303/103 X |
| 4,762,375 | 8/1988 | Maki et al. | 303/96 |
| 4,773,714 | 9/1988 | Shimanuki et al. | 303/108 |
| 4,807,941 | 2/1989 | Onogi et al. | 303/108 |
| 4,832,415 | 5/1989 | Shinomiya | 303/103 X |
| 4,877,295 | 10/1989 | Yoshino | 303/111 X |

FOREIGN PATENT DOCUMENTS

| | | |
|---|---|---|
| 2414698 | 10/1975 | Fed. Rep. of Germany . |
| 2951754 | 7/1981 | Fed. Rep. of Germany . |
| 3731483 | 4/1988 | Fed. Rep. of Germany . |
| 2136901 | 9/1984 | United Kingdom . |
| 2176557 | 12/1986 | United Kingdom . |

Primary Examiner—Douglas C. Butler
Attorney, Agent, or Firm—Scrivener and Clarke

[57] ABSTRACT

A method of controlling the brake pressure in an antilock vehicle brake system in which rotational velocities of the vehicle wheels are measured and the brake pressure is modulated in dependence upon the retardation and the slip of a wheel on exceeding threshold values provides that for each braked wheel the difference between the vehicle reference velocity and a wheel reference velocity is determined for adjusting the length of the pressure maintaining or pressure diminishing phase in dependence upon the difference.

1 Claim, 2 Drawing Sheets

METHOD OF CONTROLLING THE BRAKE PRESSURE IN AN ANTILOCK VEHICLE BRAKE SYSTEM

The invention relates to a method of controlling the brake pressure in an antilock vehicle brake system in which the rotational velocities of the vehicle wheels are measured and in dependence upon the retardation and/or the slip of a wheel on exceeding retardation or slip threshold values the brake pressure at said wheel is modulated, a reference velocity being formed in dependence upon the rotational velocity of the fastest rotating wheel.

In the technology of antilock brakes (ALB) it is known to carry out the brake control with the aid of a so-called vehicle reference velocity, often simply referred to as reference velocity, cf. in this connection in particular BOSCH TECHNISCHE BERICHTE, Vol. 7, 1980, No. 2, p. 81, corresponding to Bosch Technological Reports, English special edition, February 1982, ISSN 0006-798 X.

It is known to the expert in antilock technology that the so-called vehicle reference velocity, which should be as close as possible to the velocity, not directly measurable, of the vehicle, is used to determine the slip, i.e. the instantaneous peripheral velocity of a wheel is compared with the vehicle reference velocity and the difference gives the slip of the wheel which to obtain as short as possible a braking distance with simultaneous steerability of the vehicle is to be in the optimum range of the known coefficient of friction/slip curve.

As likewise known to the expert, the vehicle reference velocity is determined with the aid of the rotational velocities of the fastest rotating wheel of the vehicle. A frequent provision is the division of the four wheels of a vehicle into two groups of diagonally controlled wheels and the control of the two wheel groups separately, i.e. of the two diagonally arranged wheels the rotational velocity of the fastest rotating wheel is used to form the vehicle reference velocity.

Such a division into two wheel groups has the advantage that in the event of disturbances in the formation of a vehicle reference velocity an exact determination of the slip of the wheels is possible at least at the other wheels, i.e. those belonging to the other vehicle diagonal.

The use of the fastest wheel of the vehicle (or of the wheel of the vehicle) has of course the advantage that the vehicle reference velocity is frequently "supported". The term "supported" means that the vehicle reference velocity is frequently, i.e. at short intervals of time, readapted to the instantaneous vehicle situation by renewed measurement and evaluation.

However, this prior art has disadvantages in certain driving situations.

In particular, when braking in curves, especially also in emergency avoidance manoeuvres, the front wheel of the vehicle on the outside of the curve describes a greater radius than the other wheels and thus also generates the highest velocity. Thus, in accordance with the above observations the vehicle reference velocity is formed with this wheel. If braking is effected in such a situation the outer front wheel in the curve under road conditions with good coefficient of friction to obtain a short braking distance should however in this case as well reach as quickly as possible and continuously a slip which lies in the optimum range of the friction coefficient-slip graph. This optimum range of the friction coefficient-slip graph when braking in a curve lies at higher slip values than when braking in a straight line (see the above literature citation, page 68, FIG. 5). The wheel should also remain as far as possible without interruption in this range during the entire braking. Only then will a short braking distance be achieved with simultaneous steerability of the vehicle.

If however the fastest rotating wheel is used to form the vehicle reference velocity, i.e. in the situation described here the outer front wheel in the curve, and the slip calculation is related to said vehicle reference velocity, then because of the relatively high vehicle reference velocity, obtained moreover with a slight time delay, a relatively large slip is calculated for said wheel and it rapidly exceeds predetermined slip threshold values so that the brake pressure at said wheel is again diminished. Braking distance is wasted. Thus, longer remaining of the wheel in the desired high slip range is possible only if the vehicle reference velocity initially (i.e. prior to the start of the regulation of the brake pressure) kept high becomes rapidly smaller (so that the slip of said wheel also becomes smaller and does not exceed the threshold) and is also not held or brought to an excessively high value by another wheel. In an antilock braking in a curve after initiation of the control the outer rear wheel in the curve (in so-called "select low" control) is usually stable and furnishes the highest rotational velocities. As a result the vehicle reference velocity is kept too high to permit good retardation of the outer front wheel in the curve.

A further problem arises in conventional antilock controls when an emergency spare wheel is used having a rolling radius which is smaller than that of a normal wheel. The angular velocity of such an emergency spare wheel is appreciably above the angular velocity of the other wheels. Since the antilock control system does not recognise whether an ordinary wheel or a spare wheel is fitted the vehicle reference velocity is governed by the spare wheel (as the fastest rotating wheel) and the slip calculation considerably falsified, i.e. the processor of the antilock control system would react far too frequently and sensitively to slip threshold values being exceeded by the other wheels.

To avoid the disadvantages described above at least temporarily relatively high slip thresholds could be provided, i.e. the control could be set relatively "sluggish" with respect to the slip. However, such an increase in the slip threshold values has the disadvantage that, in particular on slippery road surfaces, large so-called control deviations occur, i.e. the braked wheel is brought relatively frequently into slip ranges which lie in the unstable range of the frictional value/slip characteristic so that braking distance is wasted. This solution would thus not be an optimum one.

It would furthermore be conceivable to overcome the disadvantages explained above by not using the fastest wheel peripheral velocity to form the vehicle reference velocity. However, this would result in losing the aforementioned advantages in the selection of the fastest rotating wheel.

Finally, it would also be conceivable by using special means to detect the aforementioned driving situations from the start and modify the control accordingly. Such a solution would however be very expensive and moreover very complicated so that safety would also be jeopardized.

The invention is based on the problem of further developing the method set forth at the beginning of controlling the brake pressure in an antilock vehicle brake system in such a manner that when braking in a curve or in the case of different rolling radii of the wheels with simple means as short a braking travel as possible is obtained with simultaneous good steerability of the vehicle.

According to the invention this problem is solved in that apart from the aforementioned vehicle reference velocity for each wheel a wheel reference velocity is formed for dimensioning the slip threshold values, that for each wheel the difference ($\Delta_{ref}$) between the vehicle reference velocity ($V_{refF}$) and the wheel reference velocity ($V_{refR}$) is determined and that in dependence upon said difference the length of a brake pressure maintaining or diminishing phase is adjusted.

Thus, according to the invention the length of a pressure diminishing phase which is initiated in conventional manner by exceeding of predetermined threshold values with respect to the wheel reference velocity is adjusted in dependence upon the difference between the vehicle reference velocity and the wheel reference velocity for the respective wheel, being made the longer the greater this difference.

If the vehicle reference velocity and the wheel reference velocity are equal, i.e. $\Delta_{ref}=0$, the length of a brake pressure maintaining or diminishing phase is governed in conventional manner by the exceeding of predetermined threshold values. If however $\Delta_{ref}$ is different to zero the brake pressure maintaining or diminishing phase is lengthened, this lengthening, within predetermined limit values, being the greater the greater $\Delta_{ref}$ is.

The vehicle reference velocity and the wheel reference velocity can be formed as such in conventional manner as explained above.

Preferably, the wheel reference velocity on initiation of a control at the respective wheel is formed in such a manner that the rise of the wheel reference velocity results from a fixed value of for example 0.6 g and a component dependent on the angular retardation of the wheel which can be added to the rise or subtracted therefrom.

The vehicle reference velocity is governed by the fastest rotating wheel, i.e. by the fastest wheel reference velocity.

Otherwise, all the means of the antilock system are known to the expert. The invention can be implemented by a corresponding programming of the computer of the system.

The delay of the pressure buildup signal provided according to the invention in dependence upon the difference between the vehicle reference velocity and the respective wheel reference velocity is preferably in proportional manner, i.e. the period of the delay of the pressure buildup signal (compared with a conventional control in which the pressure buildup signal starts when predetermined threshold values are exceeded) increases linearly with the difference between the vehicle reference velocity and the wheel reference velocity. The proportionality factor can be determined experimentally. Preferably, a maximum value for the delay of the pressure buildup signal is defined.

The solution according to the invention results in a number of advantages. On a circuit failure the vehicle reference velocity is usually too high. With the method according to the invention however not all the wheels will be underbraked.

Furthermore, the method according to the invention is distinguished by increased resistance to disturbances. In the event of a great number of conceivable disturbances in an ALB control system there is no erroneous detection of slip at the wheels.

Finally, the method according to the invention also provides an optimum control of the brake pressure when braking in a curve or in an emergency avoidance manoeuvre during a braking as well as when an emergency spare wheel is mounted for an individual wheel. The slip threshold values can be adjusted in relatively sensitive manner.

The method according to the invention can also be applied to so-called ASR systems, i.e. the prevention of spinning of the wheels under excessive acceleration values.

It is known from DE-A 2,101,237 to form a so-called "frictional velocity signal" which runs parallel to the actual vehicle velocity and differs from the latter by a value which is equal to the slip at the instant of releasing the brake. This publication does not teach the determination for each wheel of a difference between the vehicle reference velocity and the wheel reference velocity and adjustment of the length of the brake pressure maintaining or brake pressure diminishing phase in dependence upon said difference.

It is known from DE-A 2,951,754 to form for individual wheels of the vehicle a wheel reference velocity which influences the vehicle reference velocity. However, this publication does not teach a control of the length of the brake pressure maintaining or brake pressure diminishing phase in dependence upon a continuously determined difference between the wheel reference velocity and the vehicle reference velocity.

It is known from DE-A 1,937,123 to compare the rotational speeds of the individual wheels of the vehicle with each other and use the rotational speed of the fastest rotating wheel for the control.

Hereinafter an example of embodiment of the invention will be explained in detail with the aid of the drawings, wherein.

Figure 1A:
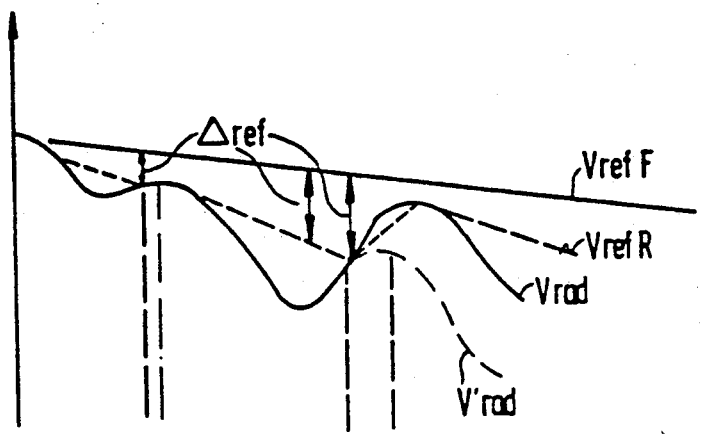
FIG. 1a shows, with respect to time, variations of the characteristic velocities of the anti-lock control of the invention.

FIG. 1a shows the variation of the vehicle reference velocity $V_{refF}$ with time. The vehicle reference velocity $V_{refF}$ is governed by the rotational velocity of the fastest rotating wheel of the vehicle (or as explained above by the rotational velocity of the fastest rotating wheel of a wheel group, for example of diagonally arranged wheels). This is known to the expert.

Furthermore, in FIG. 1a the peripheral velocity $V_{rad}$ of an individually braked wheel is plotted with continuous line for a typical curve of a brake control according to the invention whilst the curve of the wheel rotational velocity for a conventional control is shown in dot-dash line and denoted by $V'_{rad}$.

Furthermore, in FIG. 1a the wheel reference velocity $V_{refR}$ for the individual wheel is entered in dashed line. The wheel reference velocity $V_{refR}$ is obtained essentially in conventional manner.

The wheel reference velocity can be determined in that velocity signals (sensor signals) of the wheel are measured (counted) and digitized and stored as instantaneous value of the wheel velocity. The thus determined instantaneous wheel velocity value is compared with the previously determined and stored value. It is also known to form the wheel reference velocity by adding up a plurality of successively measured values of the wheel velocity to determine therefrom a mean wheel velocity and store said velocity.

Now, if the last instantaneous wheel velocity found does not differ by a predetermined amount $\Delta v$, determined continuously, from the value of the stored wheel velocity the last value of the instantaneous wheel velocity measured is again stored and taken into account into the averaging described above. The value thus obtained forms the wheel reference velocity.

If however the instantaneously last measured wheel velocity value differs by more than the given value $\Delta v$ from the stored value then it is concluded therefrom that the respective wheel has become unstable and a pressure diminishing or maintaining the pressure constant is initiated.

If an instability of the wheel has been detected in this manner the wheel velocity now measured can no longer be used to form the wheel reference velocity because the wheel reference velocity is to correspond as far as possible to the actual vehicle velocity. For this reason the wheel reference velocity is now "simulated" with plausible data. This is known per se. For example, on detection of an instability of the wheel on the basis of exceeding threshold values ($\Delta v$) the wheel reference velocity is lowered with a gradient of 0.6 g. This predetermined value of the gradient can be varied within physically plausible limits (typically between 1.1 g and 0.1 g). This is also known to the expert. For example, with high wheel angular retardation during the initial braking phase (first control cycle) it can be concluded that the road surface is slippery and accordingly the initially predetermined gradient of 0.6 g reduced by a component of for example 0.3 g so that a gradient of 0.3 g now results for the wheel reference velocity.

If on the other hand in the initial braking phase (first control cycle) a low wheel angular retardation is measured then it is concluded that a correspondingly good road surface is present and the gradient increased by addition, for example 0.5 g may be added to 0.6 g, to give a gradient of 1.1 g for the reference velocity.

Furthermore, to form the reference velocity it is also known after the first control cycle to calculate from the mean wheel angular retardations a vehicle retardation with which the gradient can likewise be corrected.

It is also possible to govern the gradients for the simulated wheel reference velocity with external means. External means denotes here means which are independent of the measured wheel rotational velocities. For example, with a mass/spring system a vehicle retardation may be deduced (an inert mass compresses a spring in accordance with the vehicle retardation). The retardation signal thus determined can also influence the wheel reference velocity.

Figure 1B:
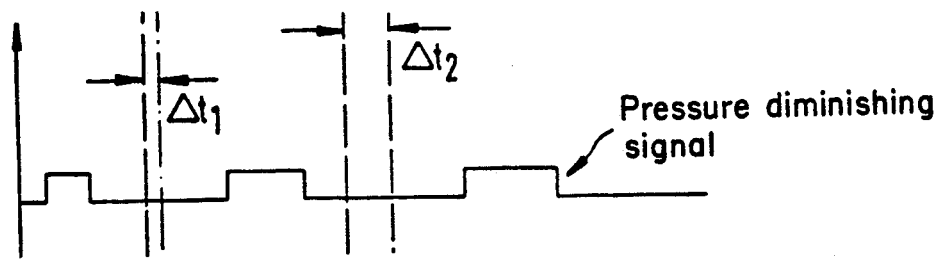
FIG. 1b shows with respect to the same time scale as 1a, brake pressure diminishing signal.
Figure 1C:
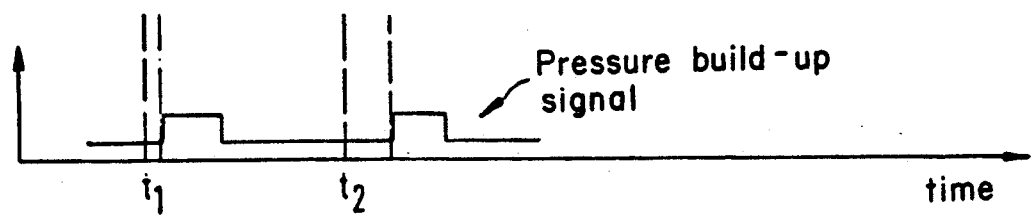
FIG. 1c shows to the same common time scale as FIGS. 1a and 1b a brake pressure build-up signal.

In FIGS. 1b and 1c the pressure diminishing signal for controlling a pressure diminishing valve for diminishing the brake pressure at the respective wheel and the pressure buildup signal for opening a pressure buildup valve with which the buildup of the brake pressure is effected are plotted.

In accordance with FIG. 1a at any instant the difference $\Delta_{ref}$ between the instantaneous wheel reference velocity $V_{refR}$ and the vehicle reference velocity $V_{refF}$ is formed and traced. At the instant $t_1$ the difference $\Delta_{ref}$ is relatively small. The time interval $\Delta t_1$ by which the pressure buildup at the end of a pressure maintaining phase or a pressure diminishing phase is retarded is therefore relatively short. At the instant $t_2$ the difference $\Delta_{ref}$ is relatively large. Correspondingly, the time interval $\Delta t_2$ by which the pressure buildup signal (FIG. 1c) is delayed is relatively longer. The peripheral velocity $V_{rad}$ of the braked wheel can then thus better adapt itself to the vehicle reference velocity $V_{refF}$. If the pressure buildup signal were not delayed by the period $\Delta t_2$ the buildup of the brake pressure would take place sooner and the peripheral velocity follow the less favourable curve $V'_{rad}$.

Figure 2:
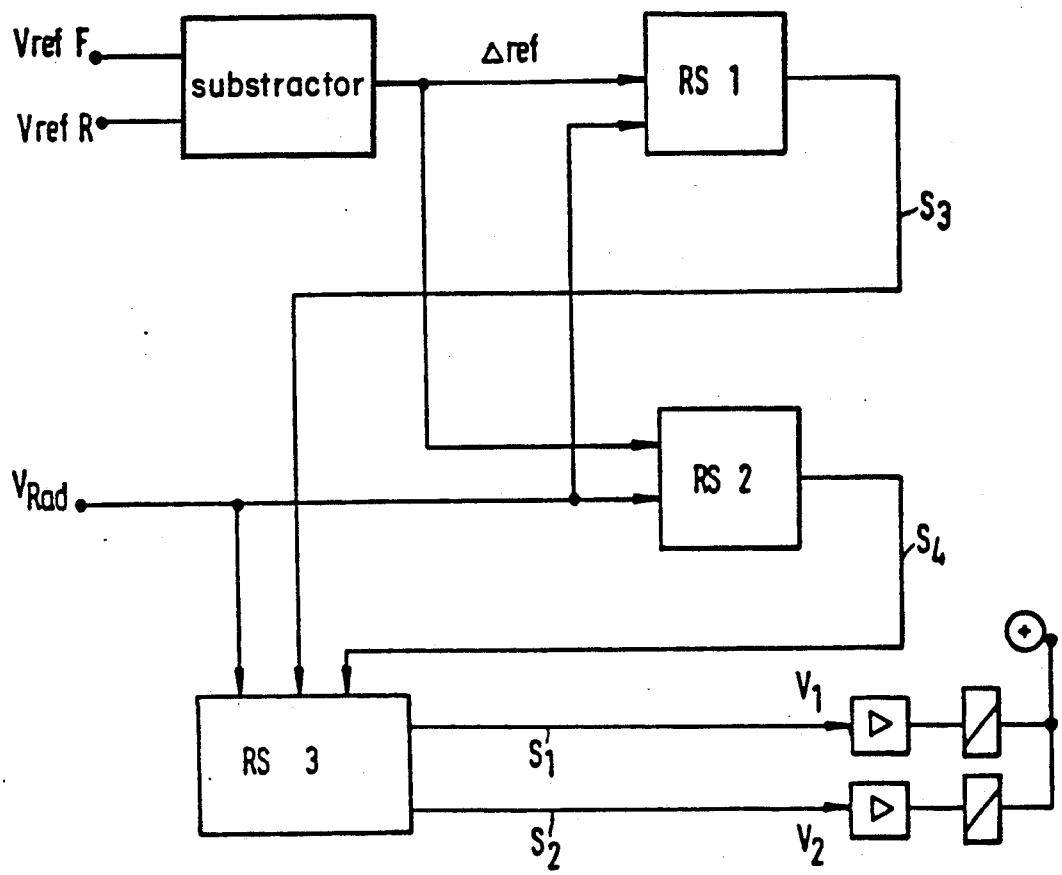
FIG. 2 is a block circuit diagram of a circuit for carrying out the brake control according to the invention.

FIG. 2 shows a block diagram of a computing circuit in which the control algorithm described above is effected. In the computing circuit $RS_3$ the essential control signals for maintaining and diminishing or building up the brake pressure are generated. At the output of the computing circuit $RS_3$ the control signals $S_1$ for the pressure maintaining and $S_2$ for the pressure buildup appear. Via power amplifiers $V_1$ and $V_2$ actuators for the valves are operated.

In accordance with FIG. 2 the vehicle reference velocity $V_{refF}$ and the wheel reference velocity $V_{refR}$ are entered into a subtractor to form the difference $\Delta_{ref}$ which is entered into the computing circuits $RS_1$ and $RS_2$. In the computing circuit $RS_1$ for each velocity difference $\Delta_{ref}$ an acceleration threshold is predefined. When the reacceleration of the wheel is less than the acceleration threshold predefined for the given velocity difference the computing circuit $RS_1$ generates a signal $S_3$ for the computing circuit $RS_3$ in accordance with which the pressure diminishing is lengthened.

In the computing circuit $RS_2$, likewise in dependence upon the instantaneously present velocity difference $\Delta_{ref}$, the period of time is determined by which the start of the pressure buildup is delayed in accordance with the intervals $\Delta t_1$ and $\Delta t_2$ according to FIG. 1. The corresponding signal $S_4$ is correspondingly processed in the computing circuit $RS_3$ for controlling the valves.

I claim:

1. A method of controlling brake pressure in an antilock vehicle brake system, the method comprising the steps of
   a) measuring rotational speeds of the vehicle wheels,
   b) determining, on the basis of said measured rotational speeds of the wheels, a vehicle reference velocity ($V_{ref}$),
   c) determining, on the basis of said measured rotational speeds of the wheels, retardation and slip values of the wheels,
   d) comparing said determined retardation and slip values with pregiven threshold values,
   e) diminishing brake pressure at a wheel if at least one of its retardation and slip values exceeds one of said threshold values,
   f) increasing the brake pressure at a wheel if the retardation and slip values of said wheel are below said threshold values,
   characterized by the steps of
   g) determining for each wheel of the vehicle, on the basis of said measured rotational speeds of the wheels, an individual wheel reference speed ($V_{refR}$), h) determining for each wheel the difference ($\Delta_{ref}$) between its determined reference speed ($V_{refR}$) and said determined vehicle reference velocity ($V_{refF}$) and i) delaying said increase of the brake pressure at a wheel in dependency of said determined difference ($\Delta_{ref}$) between the reference speed of the wheel and the vehicle reference velocity.

* * * * *